(12) United States Patent
Anderson

(10) Patent No.: US 7,850,253 B2
(45) Date of Patent: Dec. 14, 2010

(54) HYDRAULIC BRAKING POWER UNIT

(75) Inventor: David J. Anderson, Plymouth, MN (US)

(73) Assignee: Parker-Hannifin Corporation, Cleveland, OH (US)

(*) Notice: Subject to any disclaimer, the term of this patent is extended or adjusted under 35 U.S.C. 154(b) by 583 days.

(21) Appl. No.: 11/839,945

(22) Filed: Aug. 16, 2007

(65) Prior Publication Data

US 2008/0042488 A1 Feb. 21, 2008

Related U.S. Application Data

(60) Provisional application No. 60/837,977, filed on Aug. 16, 2006.

(51) Int. Cl.
*B60T 8/36* (2006.01)
(52) U.S. Cl. .............. 303/119.2; 303/DIG. 10
(58) Field of Classification Search ............. 303/3, 303/10, 15, 116.1–116.4, 7, 11, 20, 119.1–119.3, 303/DIG. 10, 116, 119
See application file for complete search history.

(56) References Cited

U.S. PATENT DOCUMENTS

| | | | |
|---|---|---|---|
| 4,174,869 A | 11/1979 | Hipps | |
| 4,435,021 A * | 3/1984 | Hoenick | 303/10 |
| 4,518,326 A | 5/1985 | Peruzzi et al. | |
| 4,988,147 A | 1/1991 | Zirps | |
| 5,039,283 A | 8/1991 | Mergenthaler et al. | |
| 5,100,305 A | 3/1992 | Zirps | |
| 5,213,482 A | 5/1993 | Reinartz et al. | |
| 5,281,013 A | 1/1994 | Pichon et al. | |
| 5,429,425 A * | 7/1995 | Drott | 303/3 |
| 5,601,345 A | 2/1997 | Tackett | |
| 5,620,311 A | 4/1997 | Wetzel | |
| 5,628,625 A | 5/1997 | Dokas | |
| 5,839,349 A | 11/1998 | Volz | |
| 6,078,118 A | 6/2000 | Reinartz et al. | |
| 6,142,751 A | 11/2000 | Krauter et al. | |
| 6,270,170 B1 * | 8/2001 | Isogai et al. | 303/119.3 |
| 6,420,811 B1 | 7/2002 | Wetzel | |
| 6,617,745 B1 | 9/2003 | Reinartz et al. | |
| 6,638,034 B2 | 10/2003 | Gegalski | |
| 7,021,911 B2 | 4/2006 | Moradmand et al. | |
| 2004/0166004 A1 | 8/2004 | Schmitt et al. | |
| 2006/0083629 A1 | 4/2006 | Dinkel et al. | |
| 2006/0099090 A1 | 5/2006 | Kramp et al. | |

FOREIGN PATENT DOCUMENTS

DE 44 19 758 12/1995

* cited by examiner

*Primary Examiner*—Melanie Torres Williams
(74) *Attorney, Agent, or Firm*—Renner, Otto, Boisselle & Sklar, LLP

(57) ABSTRACT

A hydraulic pump unit that includes a pump and an internal reservoir that is mountable as a unit to a towed vehicle. The hydraulic pump unit can be assembled in a plurality of configurations such that an inlet to the pump is located at a relatively low point within the internal reservoir depending on the orientation in which the unit is mounted to the towed vehicle. Thus, the power unit can be adapted for use in a plurality of applications thereby making the unit versatile.

18 Claims, 9 Drawing Sheets

HYDRAULIC BRAKING POWER UNIT

RELATED APPLICATIONS

This application claims the benefit of U.S. Provisional Application No. 60/837,977 filed Aug. 16, 2006, which is hereby incorporated by reference.

FIELD OF THE INVENTION

The present invention relates generally to hydraulic systems. More particularly, the invention relates to hydraulic power units for hydraulic braking systems.

BACKGROUND OF THE INVENTION

Braking systems for towed vehicles, such as horse trailers and the like for example, are often provided for braking the wheels of the towed vehicle to improve stopping distance and/or stability of the towing/towed vehicle combination. While various types of trailer braking systems exist, including electric, surge, and vacuum over hydraulic systems, one type of system that has been particularly popular is the electro-hydraulic type system.

A typical electro-hydraulic braking system includes conventional hydraulic brakes for braking the wheels of the towed vehicle connected to an electro-hydraulic pressure source that supplies pressurized fluid to actuate the brakes. The supply of pressurized fluid to the hydraulic brakes is typically modulated in response to an electrical signal generated by the towing vehicle during application of the towing vehicle's brakes. The pressure supplied to the hydraulic trailer brakes, and thus the amount of braking force generated by the hydraulic trailer brakes, can be automatically modulated in proportion to the level of braking of the vehicle, or in any other desired manner.

In the past, electro-hydraulic pressure sources have included a hydraulic pump mounted to the towed vehicle and driven by an electric motor supplied with electricity from the tow vehicle. An external reservoir is typically mounted to the towed vehicle for supplying hydraulic fluid to the pump.

In a typical system, two electrical wires carry current from the towing vehicle to the towed vehicle via any of a variety of conventional electrical connection devices. The first wire carrying electric current to the towed vehicle is connected to the electric motor. The second wire, which carries the generated signal, is connected to a device for controlling the pressure supplied to the hydraulic brakes of the towed vehicle, such as a variable valve mechanism (e.g., a proportional valve). As will be appreciated, the towed vehicle can also have a separate power source, such as a battery, and a breakaway device for applying the trailer brakes in the event the towed vehicle separates from the towing vehicle.

When electric current is supplied to the first electric wire, the electric motor drives the hydraulic pump which in turn is interconnected hydraulically with hydraulic fluid lines leading to conventional hydraulic brake cylinders located in each wheel of the towed vehicle. The aforementioned device for controlling the pressure supplied to the hydraulic brakes of the towed vehicle is interconnected hydraulically between the outlet of the hydraulic pump and the inlet thereof, in a manner such that hydraulic fluid flowing out of the outlet of the hydraulic pump and to the hydraulic wheel cylinders must flow through said variable valve means before it can return to the inlet side (e.g., the reservoir) of the hydraulic pump.

Thus, upon application of electrical current to the direct current electric motor via the electrical connection between the two vehicles, the hydraulic pump begins to circulate fluid which flows from the outlet of the pump to provide pressure to the hydraulic brake cylinders located in each wheel of the towed vehicle. Pumped fluid returns to the inlet side of the pump via a variable valve means.

Upon application of electric current to an electromagnet of the variable valve mechanism, flow through the valve is restricted incrementally in response to the amount of electric current supplied to the electromagnet. As flow through the variable valve mechanism becomes so restricted, there will be a resulting increase in hydraulic pressure supplied to the wheel cylinders of the towed vehicle, because hydraulic fluid, being pumped at a substantially constant rate by the hydraulic pump, will not be allowed to return to the inlet side of the pump at the same rate at which said hydraulic fluid is being supplied to the hydraulic lines leading to the wheel cylinders. Thus, by supplying electric current to the electric motor at the same instant at which the brakes of the towing vehicle are applied a slight pressure can be supplied to the hydraulic wheel cylinders of the towed vehicle, this initial pressure being controlled by the relationship of the pumping rate of the hydraulic pumping means to an orifice size of the variable valve in its completely open position. When further braking pressure is applied in the towing vehicle, variable electric current is supplied to the electromagnet in the variable valve causing a further restriction in the circulation of hydraulic fluid through the system, with the resulting increase in braking pressure supplied to the hydraulic wheel cylinders of the towed vehicle which is proportional to the amount of electric current supplied to the electromagnet of the variable valve.

SUMMARY OF THE INVENTION

The present invention provides a hydraulic pump unit that includes a pump and an internal reservoir that is mountable as a unit to a towed vehicle. The hydraulic pump unit can be assembled in a plurality of configurations such that an inlet to the pump is located at a relatively low point within the internal reservoir depending on the orientation in which the unit is mounted to the towed vehicle. Thus, the power unit can be adapted for use in a plurality of applications thereby making the unit versatile.

In accordance with one aspect of the invention a hydraulic pump unit for a brake system comprises a housing assembly mountable to a vehicle, an axial piston pump supported within the housing assembly and connectable to a motor, the pump having an inlet and an outlet connectable to a pressure line of the brake system for supplying pressurized fluid thereto, and a hydraulic fluid reservoir within the housing for supplying hydraulic fluid to the inlet of the hydraulic pump. The housing assembly can include first and second housing members and an inlet passageway connecting the reservoir to the pump inlet can be at least partially formed by at least one of the first and second housing members.

In one embodiment, the first housing member has a pump cavity in which the pump is supported and a reservoir cavity at least partially surrounding the pump cavity. The second housing member has a portion thereof that encloses the reservoir cavity to form the reservoir, and the second housing member includes the inlet passageway connecting the reservoir to the pump inlet. The first housing member and the second housing member are attachable to each other in a plurality of orientations such that, depending on the orientation of the unit when mounted, the inlet passageway can be positioned at the bottom of the reservoir.

At least one of the first or second housing members includes a fill opening for filling the reservoir with hydraulic fluid. The first and second housing members, being attachable to each other in a plurality of orientations, allow the fill opening to be located in a desired position, for example at the top of the unit, when the housing assembly is mounted to a vehicle. The reservoir cavity of the first housing portion can be generally annular and formed between a generally cylindrical inner wall surrounding the pump cavity and a generally cylindrical outer wall spaced from the inner wall.

The pump unit can further comprise a bypass valve between the outlet of the pump and the reservoir adapted to regulate the pressure at the outlet of the pump by controlling flow of fluid to the reservoir. The bypass valve can be a proportional valve for modulating the pressure at the outlet of the pump. The pump unit can be part of a hydraulic power unit including a motor for driving the pump. The pump unit and/or hydraulic power unit can be used for supplying pressurized fluid to a hydraulic brake actuator of a hydraulic braking system.

Further features of the invention will become apparent from the following detailed description when considered in conjunction with the drawings.

DETAILED DESCRIPTION

Figure 1:
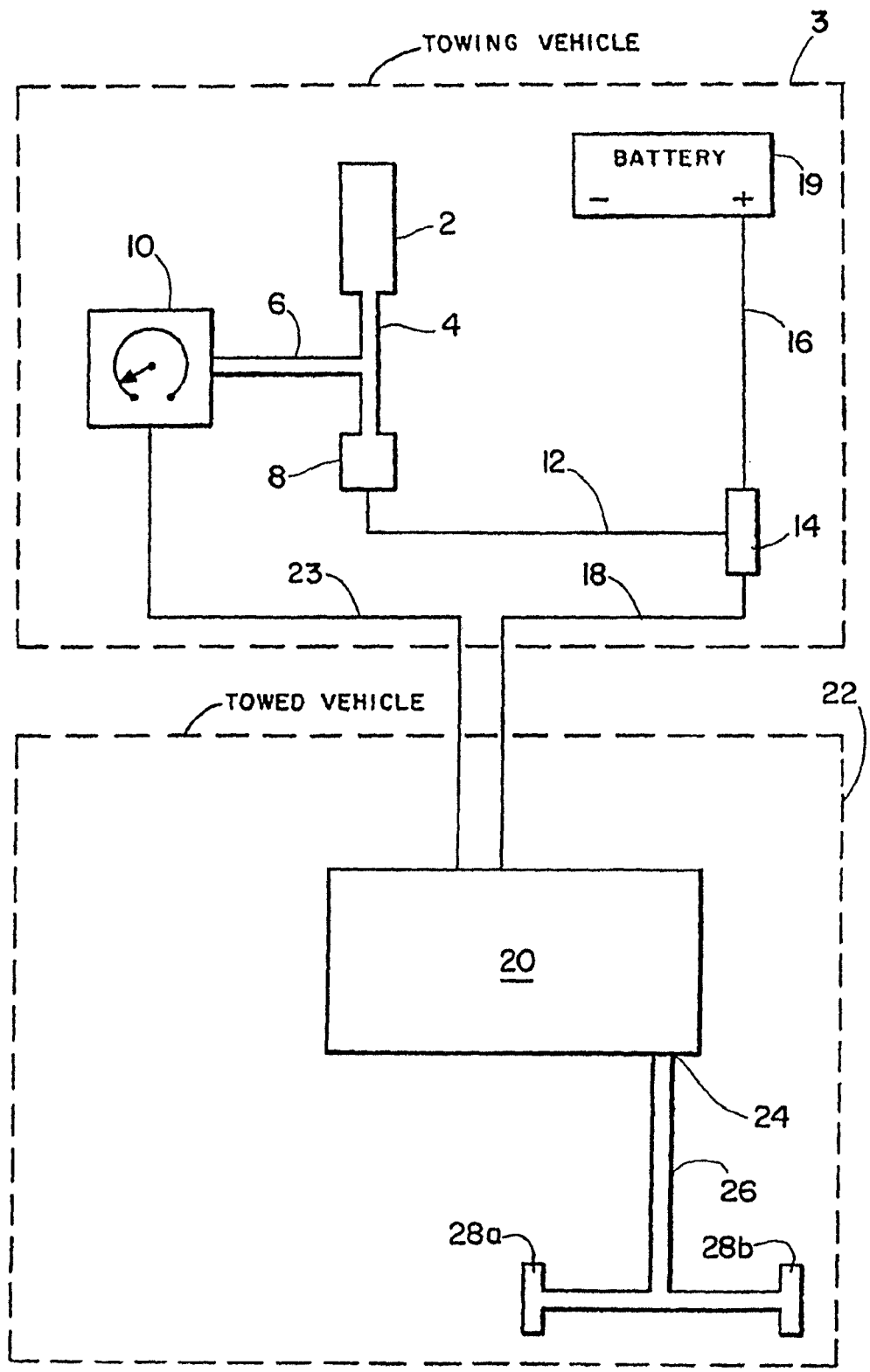
FIG. 1 is a schematic illustration of a towing vehicle/towed vehicle combination having a hydraulic brake system including a hydraulic power unit in accordance with the invention.
Figure 2:
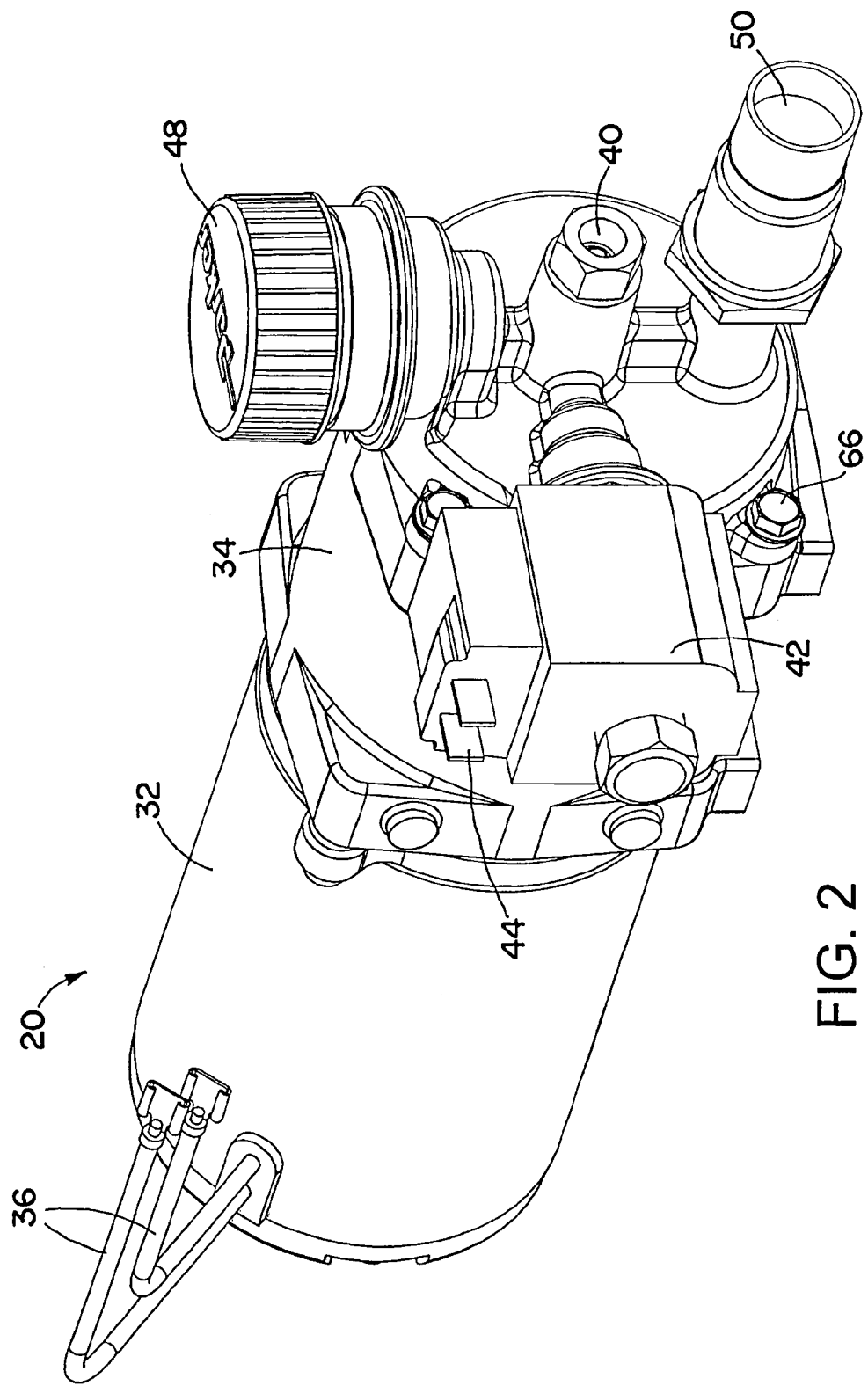
FIG. 2 is a perspective view of the hydraulic power unit in accordance with the invention.
Figure 3:
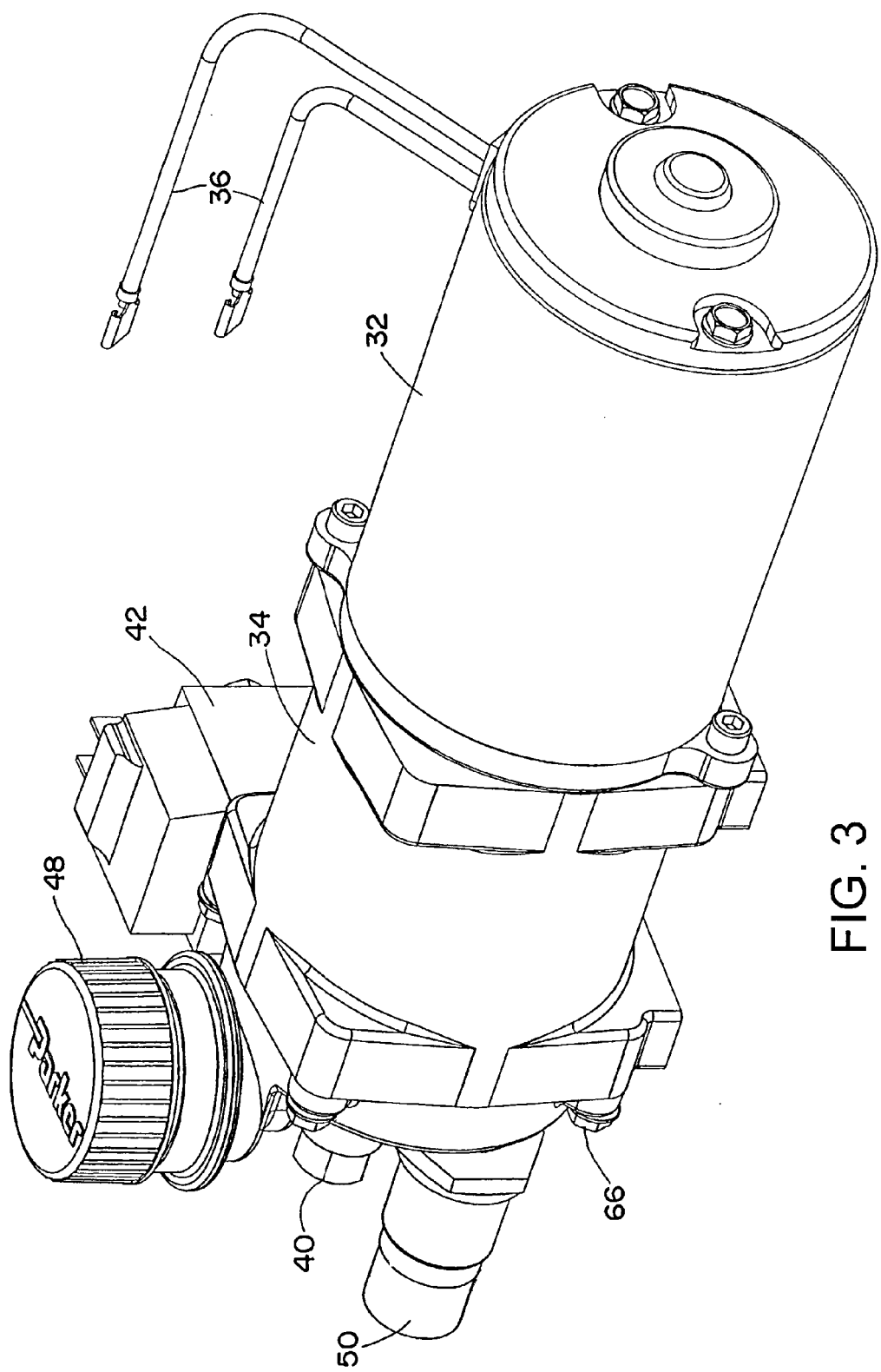
FIG. 3 is another perspective view of the hydraulic power unit.
Figure 4:
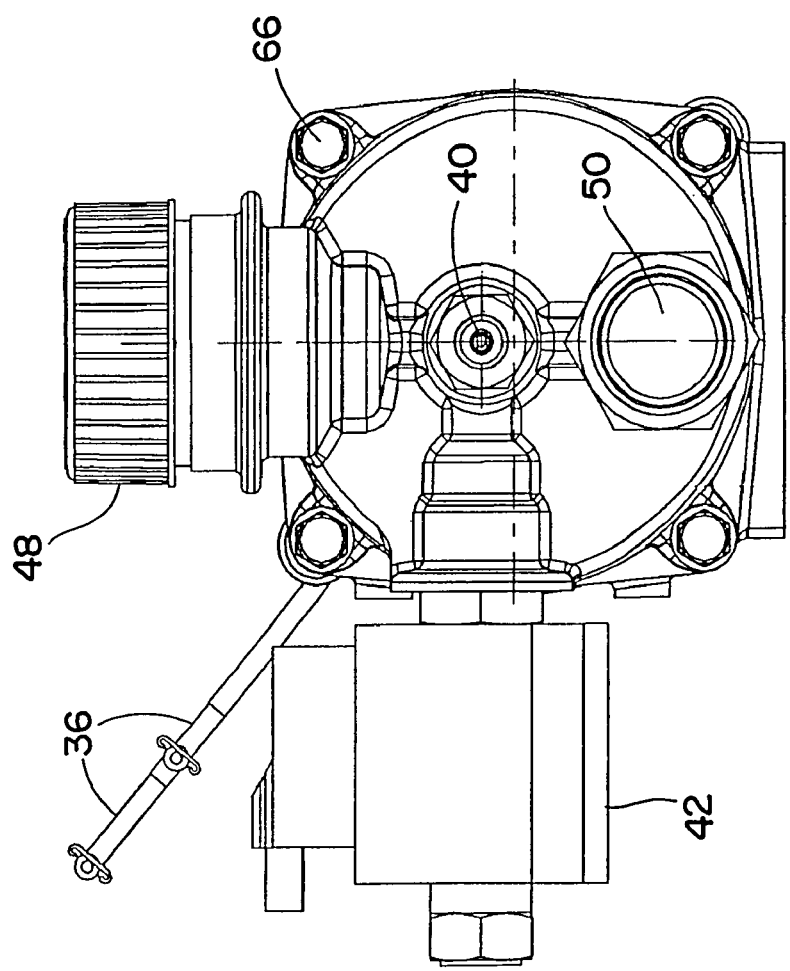
FIG. 4 is an end elevation view of the hydraulic power unit.
Figure 5:
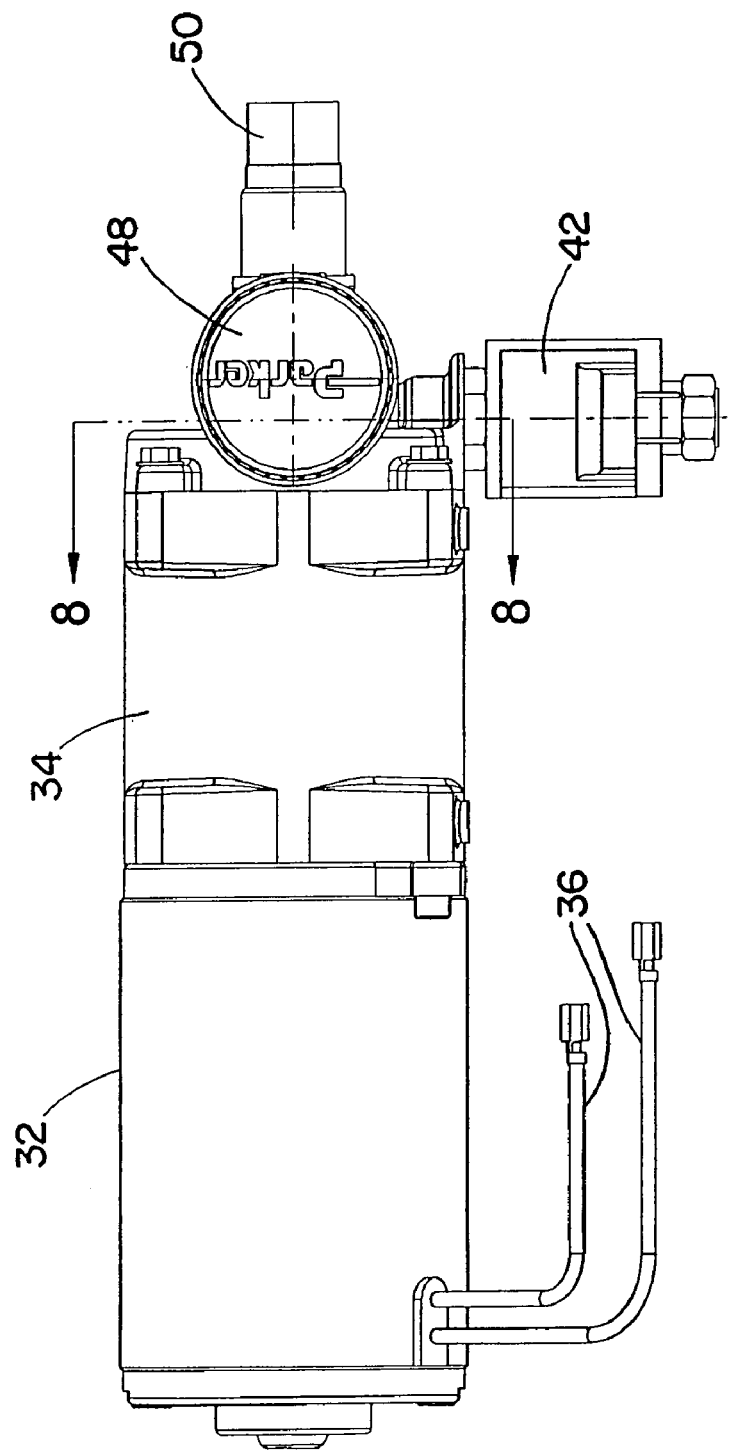
FIG. 5 is a top view of the hydraulic power unit.
Figure 6:
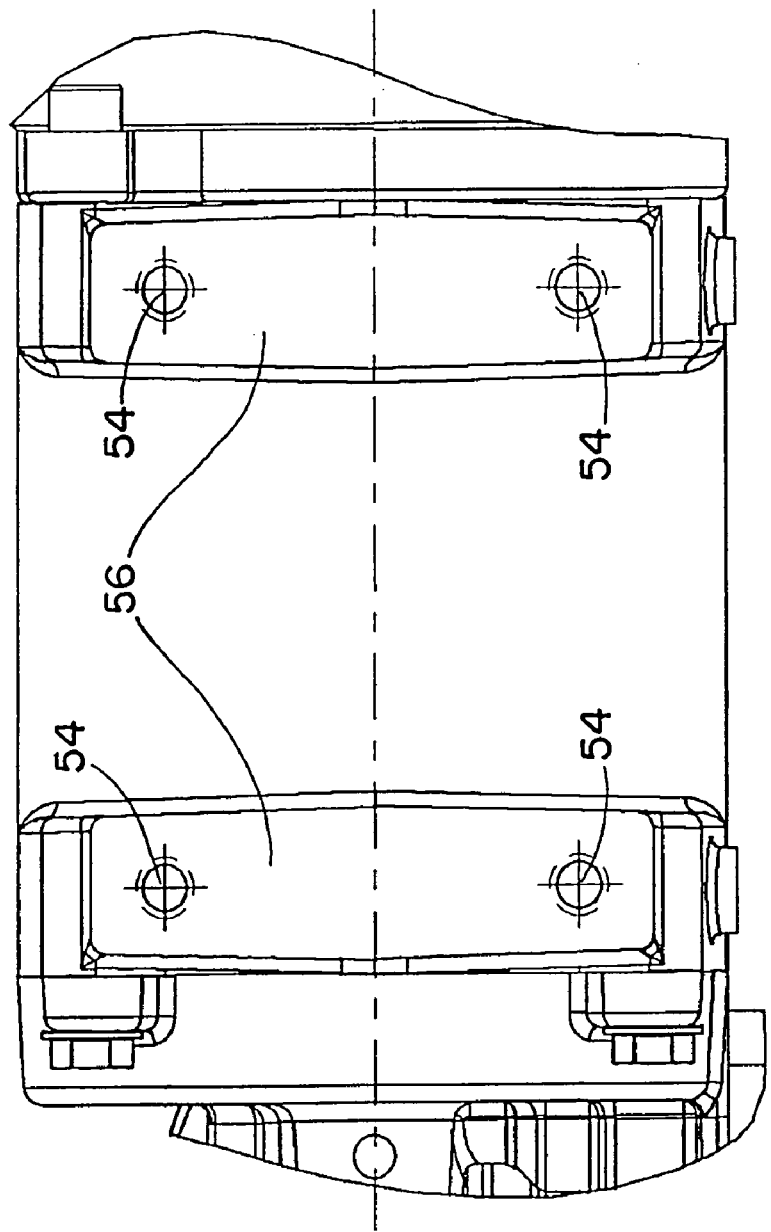
FIG. 6 is a bottom view of the hydraulic power unit.

Referring now to the drawings in detail, and initially to FIG. 1, a schematic representation of an electro-hydraulic brake actuating system including a hydraulic power unit in accordance with the invention is illustrated. In FIG. 1, a conventional master cylinder 2 of a towing vehicle 3 having conventional type hydraulic brakes is shown connected hydraulically via hydraulic lines 4 and 6 to stop light switch 8 and an electric current varying means 10 such as, for example, a rheostat or other variable resistor means. Stop light switch 8 is connected via electric wire 12 to a solenoid switch 14 which, in turn is connected via electric wires 16 and 18 to the battery or other power source of the towing vehicle and the hydraulic power unit 20 located in the towed vehicle 22, respectively. Electric wire 23 carries the output from current varying means 10 to the hydraulic power unit 20 Thus, electrical wires 23 and 18 are the only electrical connections necessary (other than conventional types of trailer brake light apparatus) between the towing vehicle 3 and the towed vehicle 22. These connections may be made by any of various types of conventional electrical connectors, such as those used in connecting brake light wiring between towing vehicle and towed vehicle.

Hydraulic power unit 20, in response to the output from current varying means 10, provides pressure through pressure outlet 24 and hydraulic line 26 to the hydraulic wheel cylinders of the towed vehicle schematically represented at 28a and 28b. Of course, any number of hydraulic wheel cylinders may be supplied with pressurized hydraulic fluid from the hydraulic power unit 20.

The schematic representation of the electro-hydraulic brake actuating system of the present invention depicted in FIG. 1 can be operated in the following manner. When the driver of the towing vehicle applies the hydraulic brakes of the towing vehicle 3, the resulting pressure in master cylinder 2 will be transmitted via hydraulic line 4 to brake light switch 8, which in turn will supply electric current via electrical wire 12 to solenoid switch 14. Solenoid switch 14 will then move to a closed position completing the electrical circuit between the battery 19 of the towing vehicle 3 and the hydraulic power unit 20. Thus, upon application of the brakes of the towing vehicle 3, hydraulic power unit 20 will begin to provide pressurized hydraulic fluid via pressure outlet 24 and hydraulic line 26 to the hydraulic wheel cylinders 28a and 28b. Further, hydraulic pressure in hydraulic line 6 in the towing vehicle, which will increase with increased pressure in master cylinder 2 will cause the electric current varying means 10 to supply increasing electric current via electric wire 23 to the hydraulic power unit 20 in the towed vehicle. Thus, the increasing electric current, which increases in response to increased braking pressure in the towing vehicle 3, will cause hydraulic power unit 20 to gradually increase the pressure provided to hydraulic wheel cylinders 28a and 28b. In this manner, increasing brake pressure in the towing vehicle 3 is translated to increasing electric current output from variable electric current means 10, which in turn is translated into increasing braking pressure in the towed vehicle 22.

Turning now to FIGS. 2-8, and initially to FIGS. 2-6, the hydraulic power unit 20 is illustrated. The hydraulic power unit 20 includes an electric motor 32 connected to a hydraulic pump unit 34. The hydraulic motor 32 has a pair of wires 36 for connecting the electric motor 32 to a power source, such as the tow vehicle's power system, for example. An output shaft (not shown) of the electric motor is drivingly connected to a pump element within the pump unit 34, as will be described in more detail below. The electric motor 32 can be any suitable electric motor, such as DC electric motor, for example.

The hydraulic pump unit 34 houses the internal reservoir and the hydraulic pump element for supplying pressurized fluid via a pressure outlet 40 to the hydraulic wheel cylinders 28a and 28b of the towed vehicle 22. The pump unit 34 also includes a fill cap 48 that can be unscrewed for filling and/or refilling the internal reservoir of the pump unit 34 with hydraulic fluid. A pressure sensor 50 is provided for sensing the pressure level of the hydraulic fluid in the pressure outlet 40. As will be appreciated, in a closed loop system the pressure sensor 50 provides a signal indicative of the pressure at the outlet to a controller. The sensed pressure can be used to determine the amount of braking force being applied by the hydraulic trailer brakes, and this information can be used by the controller to regulate the variable valve. The pressure sensor 50 is optional.

The hydraulic power unit 20 is mountable as a unit to a vehicle, such as towed vehicle 22, via four mounting holes 54 (see FIG. 6) provided in mounting flanges 56. The hydraulic power unit 20 can be mounted to any suitable surface, such as a frame member of the towed vehicle 22, for example. In a typical configuration, the hydraulic power unit 20 will be mounted on a tongue of the towed vehicle, and suitable pressure lines will be connected between the pressure outlet 40 and respective hydraulic braking assemblies that are configured to brake the wheels of towed vehicle 22. As will be appreciated, the hydraulic power unit 20 can be mounted to the towed vehicle 22 in a variety of orientations, depending on the specific application and available space on the towed vehicle 22. For example, the hydraulic power unit can be mounted to a side or on top of a frame member.

Figure 7:
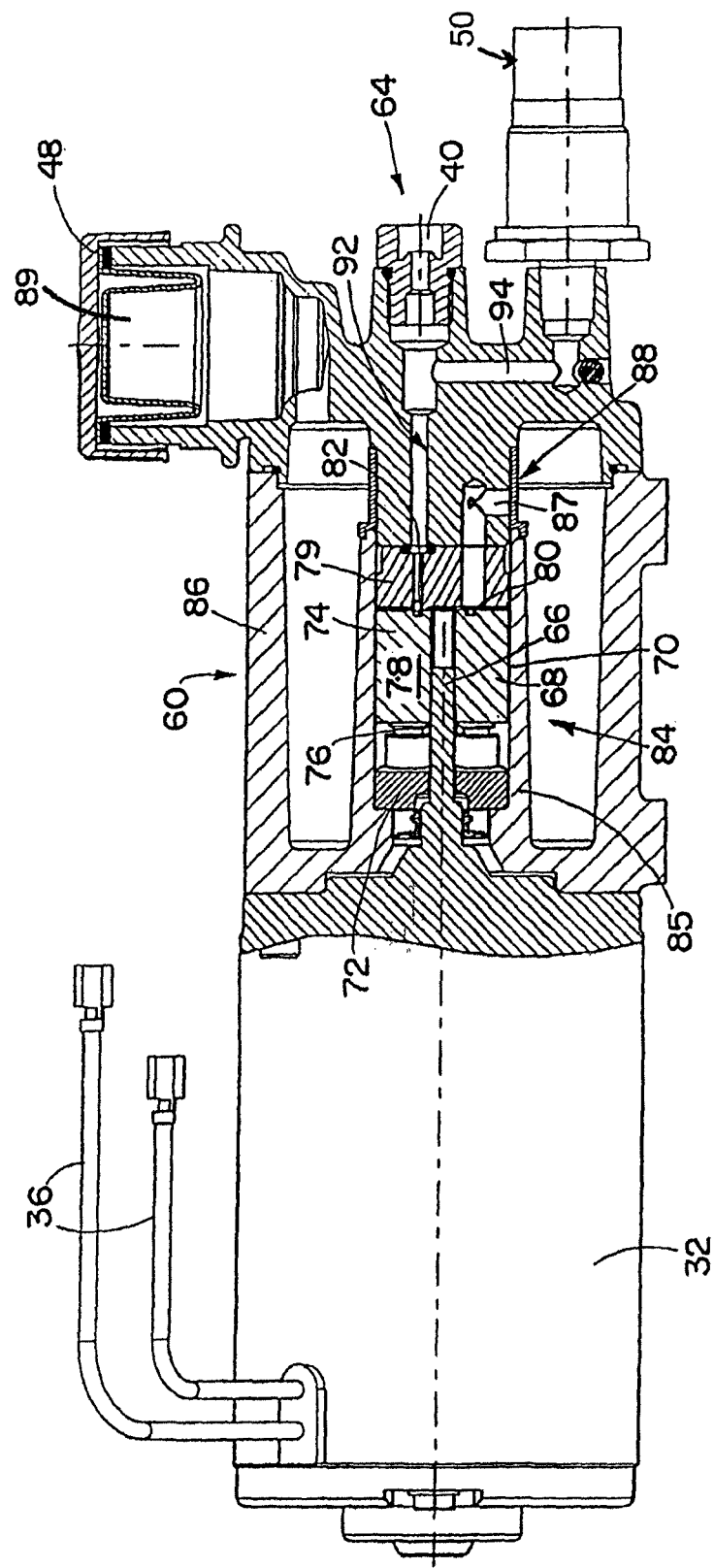
FIG. 7 is partial cross-sectional view of the hydraulic power unit.
Figure 8:
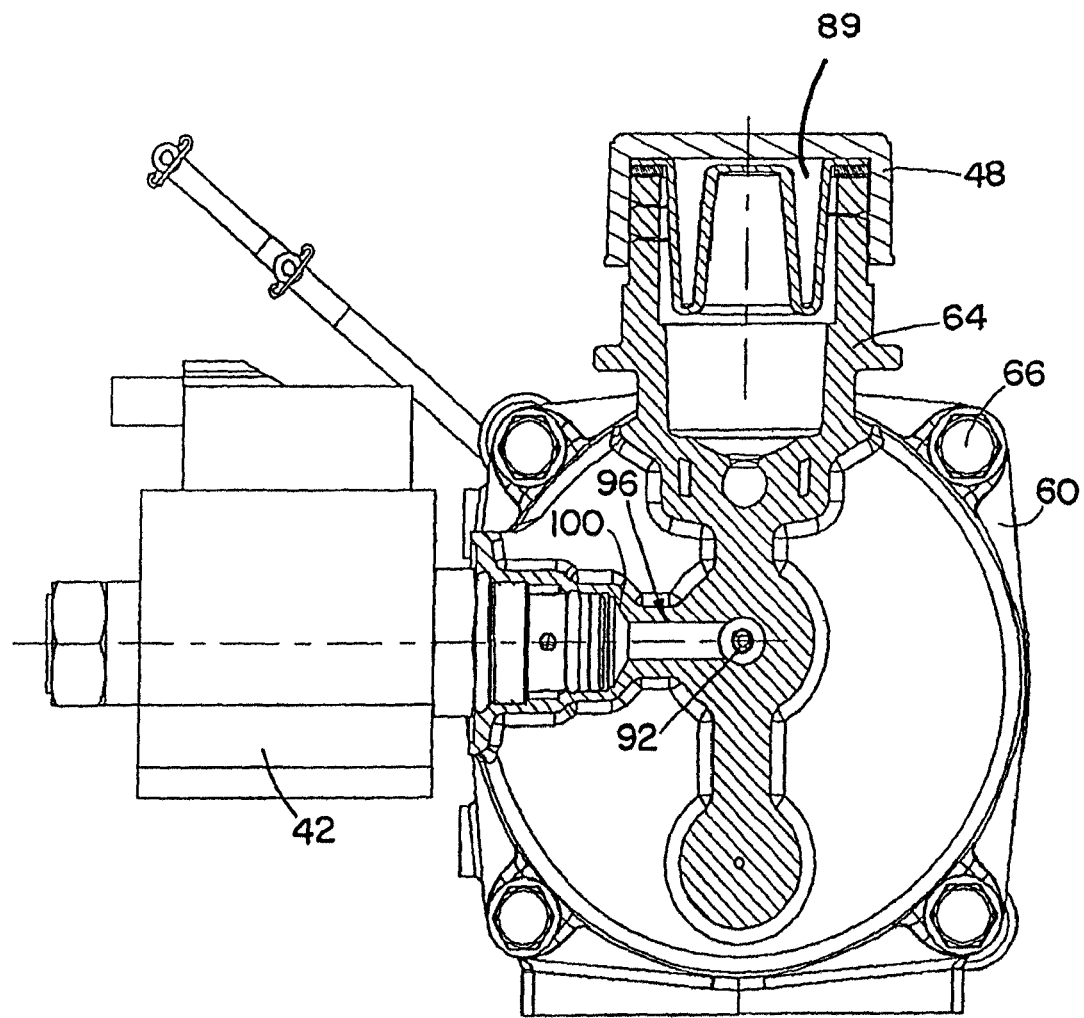
FIG. 8 is another partial cross-sectional view of the hydraulic power unit taken along the line 8-8 in FIG. 5.

Turning now to FIGS. 7-8, the internal features of the hydraulic power unit 20 are shown. The hydraulic power unit 20 has a first housing member 60 to which the electric motor 32 is secured at a first end with a pair of fasteners, such as the illustrated hex key bolts 63. A second housing member 64 is secured to the other end of first housing member 60 via four equally-spaced housing bolts 66. A drive shaft 66 of the motor 32 is drivingly connected, such as with a key or via flats on the driveshaft 66, to a pump 68 supported in a pump chamber 70 of the first housing member 60.

The pump 68 is a axial piston pump and includes a fixed swash plate 72 secured to the first housing member 60. A barrel assembly 74 rotates within the pump cavity 70 such that pistons 76 reciprocate within barrel 78 to thereby pump fluid from pump inlet 80 to pump outlet 82 in a conventional manner. The barrel assembly 74 is retained within the pump chamber 70 by port cap 79 and the second housing member 64. As described in more detail below, one or more longitudinal grooves in the pump chamber 70 can be provided for mating with corresponding protrusions on the outer circumferences of the swashplate 72 and port cap 79 to thereby fix the swashplate 72 and port cap 79 against rotation.

The first housing member 60 and second housing member 64 together form an internal reservoir 84 which is typically filled with hydraulic fluid. The internal reservoir 84 is generally formed by a reservoir cavity in the first housing member 60 between a generally cylindrical inner wall 85 surrounding the pump cavity 70 and a generally cylindrical outer wall 86 spaced from the inner wall 85. The second housing member 64 includes a surface for enclosing the reservoir cavity to form the reservoir 84, and an inlet passageway 87 that cooperates with a passageway in the port cap 79 for connecting the reservoir 84 to the pump inlet 80.

It will be appreciated that, in general, the inlet passageway 87 should be located relatively low within the reservoir 84 to ensure that adequate fluid can be supplied to the pump 68. Thus, as will be described in more detail below, upon assembly of the pump unit 34 the position of the inlet passage 87 can be determined by connecting the first housing member 60 and second housing member 64 in a manner such that the inlet passage 87 is in a desired location. Typically, the orientation of the hydraulic power unit 20 when mounted to a vehicle will dictate the desired position of the inlet passage 87. A cylindrical filter, such as screen 88, can be provided secured by the first and second housing members 60 and 64 for filtering the hydraulic fluid prior to the fluid flowing to the inlet passage 87 to pump 68.

Alternatively or additionally, at least one of the first or second housing members 60 and 64, and in FIGS. 7 and 8 the second housing member 64, includes a fill opening 89 for filling the reservoir 84 with hydraulic fluid. The first and second housing members 60 and 64, being attachable to each other in a plurality of orientations, as further discussed below, allow the fill opening 89 to be located in a desired position, for example at the top of the unit 20 when mounted to a vehicle.

The second housing member 64 further includes a discharge passage 92 that cooperates with a discharge passage in the port cap 79 to connect the pump outlet 82 to the pressure outlet 40 for supplying pressurized hydraulic fluid to the hydraulic brake elements. A pressure passageway 94 leads from the discharge passageway 92 to pressure sensor 50.

Turning to FIG. 8, the discharge passageway 92 is connected via return passageway 96 and orifice 98 to reservoir 84. As mentioned relief valve 42 is configured to variably restrict flow from the discharge passageway 92 back to the reservoir 84. Valve 42 includes a movable valve member (not shown) configured to move between an open position and a closed position wherein the valve member seals against seat 100. Orifice 98 can be sized to generate a minimum pressure in the discharge passageway 92 even when the valve 42 is in the open position.

Returning to FIG. 7, it will now be appreciated that the hydraulic pump unit 34 can be assembled in a plurality of configurations. In the illustrated embodiment, the mounting holes 54 are located on the bottom of the unit 34 while the fill cap 48 is located on the top of the unit 34. This configuration would be suitable for mounting the hydraulic power unit 20 to the top of a frame member of the tow vehicle. However, this configuration would be less desirable for mounting to the side of a frame member because in order to do so the hydraulic power unit 20 would have to be rotated 90 degrees thereby positioning the filler cap on a side of the unit rather than the top.

To allow the hydraulic power unit 20 to be mounted on the side of a frame member, the hydraulic pump unit 34 can be assembled in a different configuration such that the mounting holes 54 are on a side of the unit 34 and the fill cap 48 is on top of the unit 34. Such a configuration can be achieved by removing the four housing bolts 66, rotating the port cap 79 90 degrees, rotating the first and/or second housing members 60 and 64 90 degrees relative to each other, and reinstalling the four housing bolts 66.

It will be appreciated that the illustrated hydraulic pump unit 34 can be assembled in four different configurations by rotating the first and/or second housing members 60 and 64 in 90 degrees increments relative to each other. It will be appreciated that additional configurations can be arranged by providing additional housing bolts 66 and or arranging the housing bolts 66 in different positions. For example, by providing eight housing bolts 66, the hydraulic pump unit 34 can be configured in eight configurations.

Figure 9:
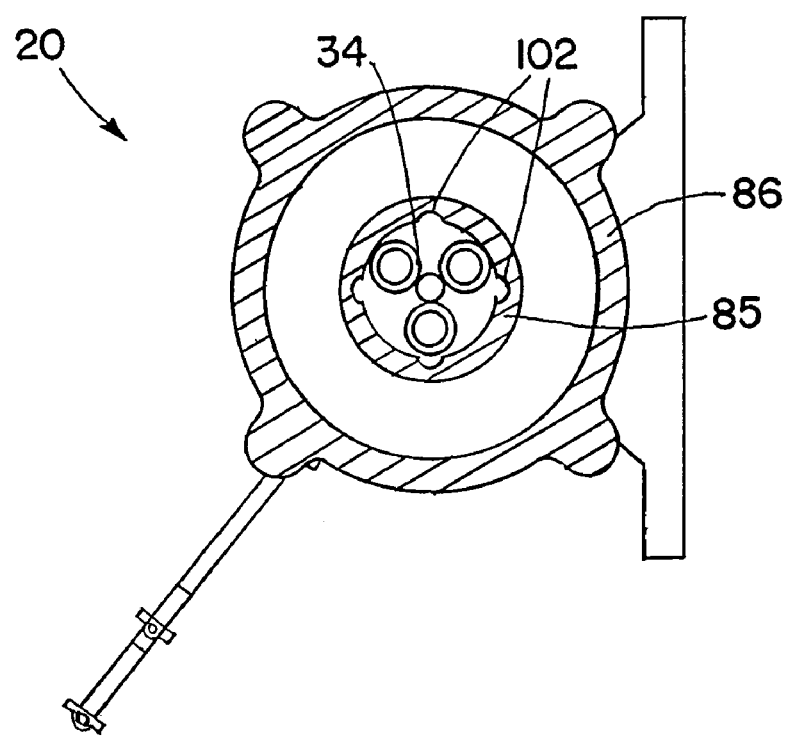
FIG. 9 is a cross-sectional view taken through the pump element.

Turning to FIG. 9, and as mentioned previously, to aid assembly of the hydraulic pump unit 34 the inside of the inner cylindrical wall 85 forming the pump cavity 70 can have one or more longitudinal grooves 102 for mating with protrusions or tangs on the outer circumferential surfaces of the swash plate 72 and port cap 79. The grooves can be, for example, spaced 90 degrees apart such that the swash plate 72 and/or port cap 79 can be positioned in one of 4 positions corresponding to the positions of the inlet passageway 86 when the first and second housing members 60 and 64 are secured together.

It will now be appreciated that at least a portion of the inlet passageways, outlet passageways and reservoir of the hydraulic pump unit 34 are formed at least partially by the first and/or second housing portions 60 and 64 when the housing portions 60 and 64 are assembled. Thus, the hydraulic pump assembly 34 is easily assembled without the need to separately connect supply and/or return lines to the reservoir, as is typically the case for pump units having external reservoirs. Further, the hydraulic pump unit 34 is versatile as it can be configured in a plurality of arrangements so as to allow the unit to be mounted in a variety of orientations simply by assembling the unit 34 in a desired manner.

While the invention has been described in the context of a hydraulic power unit for a towed vehicle hydraulic braking system, it will be appreciated that the invention is equally applicable to other types of hydraulic braking systems, and other types of hydraulic systems in general. Further, other types of brake controllers, such as accelerometers, spring-loaded force transducers, etc. can be used for controlling the hydraulic power and or pump unit of the invention.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A hydraulic pump unit for a brake system comprising:
   a housing assembly mountable to a vehicle as a unit, the housing assembly including first and second housing members;
   an axial piston pump supported within the first housing member and connectable to a motor, the pump having an inlet and an outlet connectable to a pressure line of the brake system for supplying pressurized fluid thereto; and
   a hydraulic fluid reservoir within the housing assembly for supplying hydraulic fluid to the inlet of the hydraulic pump;
   wherein the housing assembly includes an inlet passageway connecting the reservoir to the pump inlet and a fill opening for filling the reservoir with hydraulic fluid; and
   wherein the first housing member and the second housing member are attachable to each other in a plurality of relatively rotated orientations such that, depending on the orientation of the unit when mounted to a vehicle, at least one of: (a) the inlet passageway is positioned toward the bottom of the reservoir; and (b) the fill opening opens in a generally upward direction.

2. A hydraulic pump unit as set forth in claim 1, wherein the inlet passageway connecting the reservoir to the pump inlet is at least partially formed by at least one of the first and second housing members.

3. A hydraulic pump unit as set forth in claim 2, wherein the first housing member has a pump cavity in which the pump is supported and a reservoir cavity, and wherein the second housing member has a portion thereof that encloses the reservoir cavity to form the reservoir.

4. A hydraulic pump unit as set forth in claim 2, wherein the reservoir cavity of the first housing portion is formed between a generally cylindrical inner wall surrounding the pump cavity and a generally cylindrical outer wall spaced from the inner wall.

5. A hydraulic pump unit as set forth in claim 1, wherein the reservoir is a generally annular shape and surrounds the pump.

6. A hydraulic pump unit as set forth in claim 1, further comprising a bypass valve between the outlet of the pump and the reservoir, the bypass valve adapted to regulate the pressure at the outlet of the pump by controlling flow of fluid to the reservoir.

7. A hydraulic pump unit as set forth in claim 6, wherein the bypass valve is a proportional valve for modulating the pressure at the outlet of the pump.

8. A hydraulic power unit including the pump unit as set forth in claim 1 and a motor connected to the pump unit for driving the pump.

9. A hydraulic brake system including a hydraulic brake actuator assembly mountable to a vehicle for braking a wheel thereof, and the pump unit as set forth in claim 1 for supplying pressurized fluid to the hydraulic brake actuator.

10. A hydraulic power unit for a hydraulic brake system comprising:
    the hydraulic pump unit as set forth in claim 1, and
    an electric motor drivingly connected to the pump.

11. A hydraulic power unit as set forth in claim 10, wherein the inlet passageway connecting the reservoir to the pump inlet is at least partially formed by at least one of the first and second housing members.

12. A hydraulic power unit as set forth in claim 11, wherein the first housing member has a pump cavity in which the pump is supported and a reservoir cavity, and wherein the second housing member has a portion thereof that encloses the reservoir cavity to form the reservoir.

13. A hydraulic power unit as set forth in claim 10, wherein the reservoir cavity of the first housing portion is formed between a generally cylindrical inner wall surrounding the pump cavity and a generally cylindrical outer wall spaced from the inner wall.

14. A hydraulic power unit as set forth in claim 10, wherein the reservoir is a generally annular shape and surrounds the pump.

15. A hydraulic power unit as set forth in claim 10, further comprising a bypass valve between the outlet of the pump and the reservoir, the bypass valve adapted to regulate the pressure at the outlet of the pump.

16. A hydraulic power unit as set forth in claim 15, wherein the bypass valve is a proportional valve for modulating the pressure at the outlet of the pump.

17. A hydraulic power unit as set forth in claim 10, wherein the motor is supported by the housing assembly.

18. A hydraulic brake system including the hydraulic power unit as set forth in claim 10.

* * * * *